(12) United States Patent
Tomita

(10) Patent No.: US 6,643,820 B2
(45) Date of Patent: *Nov. 4, 2003

(54) SIGNAL PROCESSING CIRCUIT WITH TIMING RECOVERY PLL

(75) Inventor: Tsuyoshi Tomita, Kasugai (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/430,100

(22) Filed: Oct. 29, 1999

(65) Prior Publication Data

US 2002/0174396 A1 Nov. 21, 2002

(30) Foreign Application Priority Data

Nov. 6, 1998 (JP) .......................... 10-315999

(51) Int. Cl.[7] .......................... G06K 5/04; G11B 20/20; G11B 5/00; G06B 11/00
(52) U.S. Cl. ...................... 714/798; 714/700
(58) Field of Search ................ 714/700, 755, 714/789, 798, 814, 815; 360/26

(56) References Cited

U.S. PATENT DOCUMENTS

| | | | | |
|---|---|---|---|---|
| 4,539,707 A | * | 9/1985 | Jacobs et al. | 455/47 |
| 4,989,073 A | * | 1/1991 | Wagner | 348/498 |
| 5,067,139 A | * | 11/1991 | Baker et al. | 375/332 |
| 5,552,942 A | * | 9/1996 | Ziperovich et al. | 360/51 |
| 5,617,374 A | * | 4/1997 | Ohmi et al. | 327/147 |
| 5,771,127 A | * | 6/1998 | Reed et al. | 360/40 |
| 5,802,123 A | * | 9/1998 | Yoshimura et al. | 327/147 |
| 5,870,441 A | * | 2/1999 | Cotton et al. | 327/144 |
| 5,959,682 A | * | 9/1999 | Kim et al. | 331/20 |
| 6,111,878 A | * | 8/2000 | Powell | 370/352 |
| 6,144,627 A | * | 11/2000 | Muto | 369/30.21 |
| 6,294,960 B1 | * | 9/2001 | Omori | 331/14 |
| 6,307,696 B1 | * | 10/2001 | Bishop et al. | 360/51 |
| 6,307,900 B1 | * | 10/2001 | Choi | 375/341 |

* cited by examiner

Primary Examiner—Albert Decady
Assistant Examiner—Joseph P. Torres
(74) Attorney, Agent, or Firm—Greer, Burns & Crain, Ltd.

(57) ABSTRACT

A signal processing circuit for processing a read signal corresponding to data read from a recording medium, such as a magnetic disc. The signal processing circuit detects a preamble data signal of the read signal. A decision feedback equalizer (DFE) generates a computation read signal by performing a predetermined computation on the read signal in accordance with a clock signal. The DFE generates first code data using the computation read signal. A code data generating circuit connected to the DFE compares the computation read signal with a first reference signal and generates second code data, which corresponds to the preamble data signal. A phase error detection circuit detects a phase error between the clock signal and the read signal using one of the first and second code data. A timing recovery PLL is connected to the phase error detection circuit and uses the detected phase error to generate the clock signal such that the phase of the clock signal matches the phase of the preamble data signal.

21 Claims, 5 Drawing Sheets

SIGNAL PROCESSING CIRCUIT WITH TIMING RECOVERY PLL

BACKGROUND OF THE INVENTION

The present invention relates to a signal processing circuit, and more particularly, to a signal processing circuit including a timing recovery PLL for matching a clock signal with preamble data signal read from a recording medium and a decision feedback equalizer for reproducing code data recorded on the recording medium based on the clock signal, and to a method for controlling the signal processing circuit.

A decision feedback equalizer (DFE) reproduces data read from a recording medium in accordance with a clock signal generated by a timing recovery PLL. The timing recovery PLL performs a so-called matching operation, in which the output timing of the clock signal is matched with the output timing of the reproduction data from the DFE based on preamble data (matching pattern) recorded on the recording medium.

FIG. 1 is a schematic block diagram showing a prior art signal processing circuit. The signal processing circuit 10 includes an analog-to-digital converter (ADC) 11, a DFE 12, two coefficient registers 13, 14, a PLL phase error detection circuit 15, a timing recovery PLL (TR-PLL) 16, and a control circuit 17.

The ADC 11 samples the analog signal read from the recording medium in accordance with a clock signal CLK generated by the TR-PLL 16 and converts the analog data signal to a digital data signal. The digital data signal is sent to the DFE 12.

The DFE 12 includes a forward (FW) filter 21, an adder 22, a comparator 23, a shift register 24, a feedback (FB) filter 25, an inverter 26, and three switches 27, 28, 29.

The FW filter 21 is connected to the coefficent registers 13, 14 via the first switch 27. A first filter coefficient (start value) used by the FW filter 21 during start-up (i.e., during initiation of the reading operation) is stored in the first coefficient register 13. A second filter coefficient (normal value) used by the FW filter 21 during normal operation (after detection of the preamble data) is stored in the second coefficient register 14. Switching of the first switch 27 selectively sends the filter coefficient of the start value and the filter coefficient of the normal value to the FW filter 21.

The FW filter 21 uses the first filter coefficient to filter the digital data signal from the ADC 11 in accordance with the clock signal CLK during the initial period of the reading operation to generate a signal S1 having a maximum S/N ratio. The FW filter 21 uses the second filter value to perform filtering in the same manner during normal operation to generate the signal S1.

The adder 22 receives the filtered output signal S1 from the FW filter 21 and a feedback signal S2 from the FB filter 25, and adds the output signal S1 and the inverted signal of the feedback signal S2. In other words, the adder 22 functions as a subtractor, subtracting the feedback signal S2 from the output signal S1.

The comparator 23 receives an added signal S3 from the adder 22, compares the voltage of the added signal S3 with a reference voltage REF, and sends a determination signal S4, which is code data (i.e., one or zero) indicating the comparison result, to the shift register 24 via the second switch 28.

The shift register 24 samples the determination signal S4 from the comparator 23 in synchronism with the clock signal CLK and sequentially stores the sampled data. This stores the data, which comprises a plurality of bits, sampled in the past.

The data stored in the shift register 24 is output as a reproduction signal DATA. The data stored in the first bit of the shift register 24 (i.e., the determination signal S4) is the output as a reproduction signal DATA. In this manner, the DFE 12 reproduces code data recorded on the recording medium. The reproduction signal DATA is sent to an external apparatus, such as a microcomputer, after undergoing a data decoding process.

The FB filter 25 receives sampling data from the shift register 24 and eliminates interference between codes that is included in the sampling data. Further, the FB filter 25 outputs the feedback signal S2, which is based on the sampling data, having a plurality of bits and stored in the shift register 24. The feedback signal S2 is sent to the adder 22 via the third switch 29.

The PLL phase error detection circuit 15 receives the added signal S3 from the adder 22 and a signal S6, detects an error or difference between the phase of the read signal and the phase of the clock signal CLK based on the signals S3, S6, and generates a control signal S7 in accordance with the detected error. The signal S6 is either the determination signal S4 of the comparator 23 or the output signal S5 of the inverter 26 which are selected by the switching operation of the second switch 28. The TR-PLL 16 receives the control signal S7 from the PLL phase error detection circuit 15, and matches the phase of the generated clock signal CLK with the phase of the read signal. The shift register 24 is used to perform sampling in accordance with the clock signal CLK from the TR-PLL 16. The sampling is performed at the bit transmission speed of a read signal RD in order to store the determination signal in the shift register 24. The detection signal corresponds to the recorded data on a magnetic disc, The control circuit 17 receives the reproduction signal DATA from the shift register 24 and controls the switches 27–29 in accordance with the state of the reproduction signal DATA and the number of the bytes read subsequent to the initiation of the reading operation. The preamble data is data in which the pattern of a predetermined number of bits is repeated. A predetermined amount of preamble data is stored on the recording medium. Accordingly, the control circuit 17 controls the switches 27–29 at a predetermined timing based on the amount of preamble data read.

The control circuit 17 performs switch control as described below.

(1) When initiating the reading operation, the control circuit 17 moves the first switch 27 to the first coefficient register 13, the second switch 28 to the comparator 23, and opens the third switch 29. Thus, the FW filter 21 uses the first filter coefficient (start value) from the first coefficient register 13 to shape the waveform of the digital signal from the ADC 11. In this state, the adder 22 sends the output signal S1 of the FW filter 21 to the comparator 23 since the third switch 29 is open. The error detection circuit 15 sends the control signal S7, which is based on the output signal S1 (read signal) from the FW filter 21, to the TR-PLL 16. In this manner, the TR-PLL 16 performs phase matching in accordance with the read signal.

(2) When the control circuit 17 confirms from the reproduction signal DATA that the bit row showing the characteristics of the preamble data (in this case, "+++" or "---") has been input a predetermined number of times (e.g., three times), the control circuit 17 moves the first switch 27 to the second coefficient register 14, the second switch 28 to the inverter 26, and closes the third switch 29. Here, "+" indicates that the voltage of the sampled read signal RD is higher than the reference voltage REF, and "−" indicates that the voltage of the sampled read signal RD is lower than the reference voltage REF.

The FW filter 21 shapes the waveform of the digital signal from the ADC 11 using the second filter coefficient (normal value) from the second coefficient register 14. The sampling data stored in the shift register 24 is inverted by the inverter 26. The shift register 24 receives the inverted sampling data via the second switch 28. Accordingly, the shift register 24 repetitively stores the bit row "+++−−−" of the preamble data. This initializes the sampling data in the shift register 24 to preamble data.

The adder 22 receives the feedback signal S2 via the third switch 29 from the FB filter 25. That is, the control circuit 17 closes the feedback loop of the DFE 12. Thus, the adder 22 adds the output signal S1, which is derived from the read signal RD and sent from the FW filter 21, with the feedback signal S2 and sends the added signal S3 to the comparator 23 and the error detection circuit 15.

(3) The control circuit 17 counts the byte number of the reproduction signal DATA from the shift register 24 after performing the control described in (2) above, and outputs an enable signal for matching the frequency of the TR-PLL 16 after counting a predetermined number of bytes (e.g., five bytes).

(4) The control circuit 17 counts the byte number of the reproduction signal DATA from the shift register 24 after performing the control described in (3) above, and moves the second switch 28 to the comparator 23 after counting a predetermined number of bytes (e.g., six bytes). In this state, the first switch 27 remains set to the second coefficient register 14, and the third switch 29 remains closed. In this manner, the TR-PLL 16 performs phase matching in accordance with the read signal. The DFE 12 outputs a reproduction signal from which interference between codes is eliminated in accordance with the clock signal CLK.

However, in the above control method, the coefficient of the FW filter 21 must be altered to the data reading second filter coefficient before reading the data that follows the preamble data. This greatly changes the characteristics of the FW filter 21 during the matching operation of the TR-PLL 16. Furthermore, since the FW filter 21 has a multi-stage structure, a relatively long time is required to output the filtered digital signal S1 using the altered coefficient. The signal S1 output by the FW filter 21 during the blank period destabilizes the state of the TR-PLL 16 and may cause a pseudo-lock. Therefore, the operation of the TR-PLL 16 must be stopped from when the first switch 27 is moved to the second register 14 to when the digital signal S1, which is based on the second filter coefficient, is output. This prolongs the matching operation period and hinders shortening of the signal processing time.

SUMMARY OF THE INVENTION

Accordingly, it is an object of the present invention to provide a signal processing circuit that prevents pseudo-lock of the timing recovery PLL.

In one aspect of the present invention, a method for controlling a timing recovery PLL is provided. The timing recovery PLL matches the phase of a clock signal with the phase of a preamble data signal. The preamble data signal is part of a read signal corresponding to data read from a recording medium. The method includes the steps of generating a computation read signal by performing a predetermined computation on the read signal, generating a first code data using the computation read signal, comparing the computation read signal and a first reference signal, generating a second code data corresponding to the preamble data signal based on the comparison result, detecting a phase error between the clock signal and the read signal by using the computation read signal and one of the first code data and the second code data, and matching the phase of the clock signal in accordance with the detected phase error.

In another aspect of the present invention, a signal processing circuit is provided. The signal processing circuit includes a decision feedback equalizer for generating a computation read signal by performing a predetermined computation on a read signal read corresponding to data read from a recording medium in accordance with a clock signal. The read signal includes a preamble data signal. The decision feedback equalizer generates first code data by using the computation read signal. The code data generating circuit is connected to the decision feedback equalizer to compare the computation read signal with a first reference signal and generate a second code data based on the comparison result. The second code data corresponds to the preamble data signal. A phase error detection circuit detects the phase error between the clock signal and the read signal using one of the first code data and the second code data. A timing recovery PLL is connected to the phase error detection circuit to generate the clock signal such that the clock signal has a phase matching the phase of the preamble data signal in accordance with the detected phase error.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENT

Figure 1:
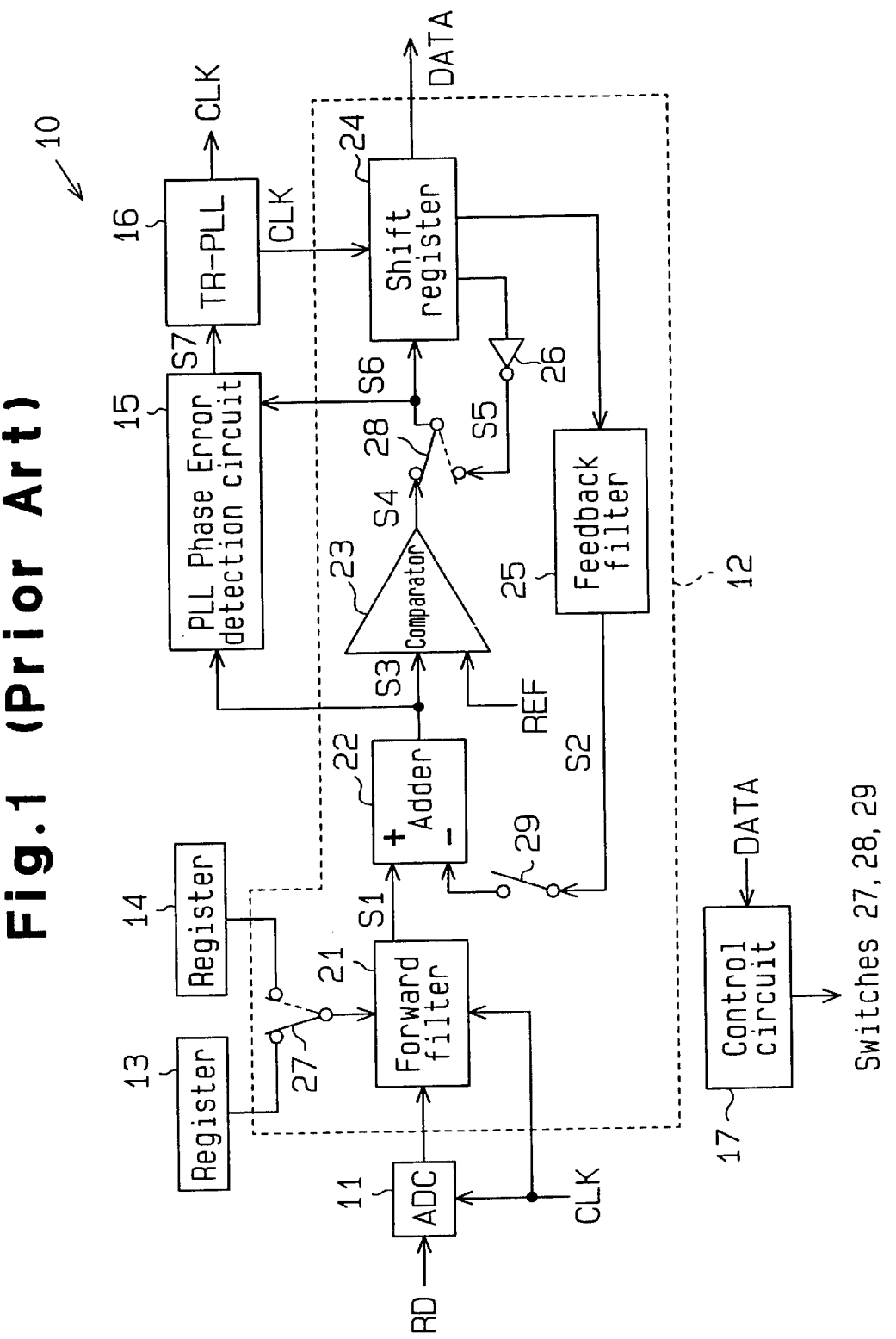
FIG. 1 is a schematic block diagram showing a prior art signal processing circuit.

In the drawings, like numerals are used for like elements throughout.

Figure 2:
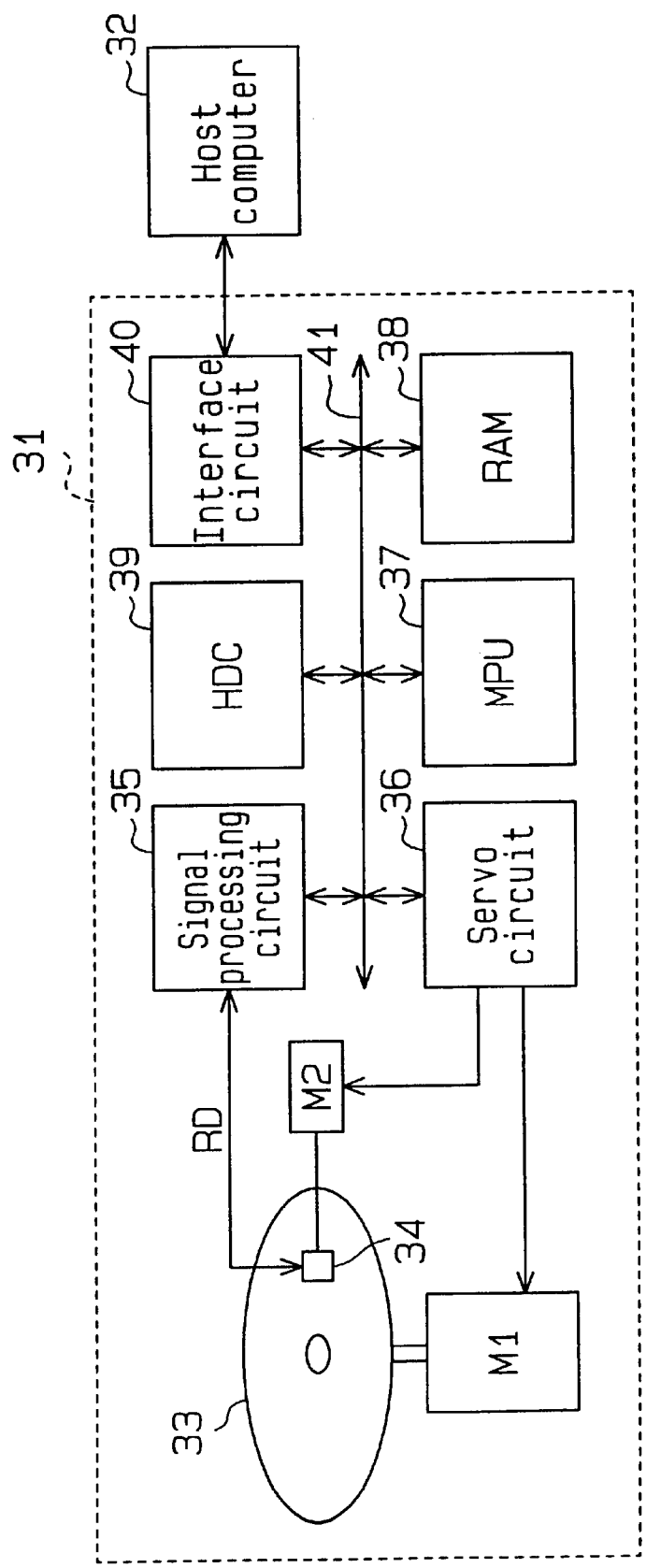
FIG. 2 is a schematic block diagram showing a hard disc apparatus according to one embodiment of the present invention.

FIG. 2 is a schematic block diagram showing a hard disc apparatus 31 according to one embodiment of the present invention The hard disc apparatus 31 is connected to a host computer 32. The hard disc apparatus 31 responds to the write request by the host computer 32 and records the recording data from the host computer 32 on a magnetic disc 33, which serves as a recording medium. The hard disc apparatus 31 further responds to the read request from the host computer 32, reads the data recorded on the magnetic disc 33, and sends the data to the host computer 32.

The hard disc apparatus 31 includes the magnetic disc 33, first and second motors M1, M2, a head device 34, a signal processing circuit 35, a servo circuit 36, a microprocessor (MPU) 37, a memory (RAM) 38, a hard disc controller (HDC) 39, and an interface circuit 40. The circuits 35–40 are connected to one another by a bus 41.

The magnetic disc 33 is rotated by the first motor M1 at a constant rotating speed. The second motor M2 controls the head device 34 so that it moves in the radial direction with respect to the magnetic disc 33. The head device 34 reads the data recorded on the magnetic disc 33 and sends a read signal RD to the signal processing circuit 35.

The signal processing circuit (called read/write channel IC) 35 samples the read signal RD in synchronism with a clock signal and generates a digital read signal. The signal processing circuit 35 carries out a decoding process on the digital read signal and outputs the decoded data signal.

The servo circuit 36 controls the first motor M1 and rotates the magnetic disc 33 at a constant speed. The servo circuit 36 further receives the decoded data signal from the signal processing circuit 35 via the bus 41 and controls the second motor M2 based on the servo data included in the digital read signal so that the head device 34 is on track at the target position.

The MPU 37 analyzes the write/read processing command sent from the host computer 32 in accordance with the program data stored in the RAM 38 and sends a control signal to the HDC 39 via the bus 41. The HDC 39 controls the signal processing circuit 35 and the servo circuit 36 in accordance with the control signal from the MPU 37. The HDC 39 further receives a data signal from the signal processing circuit 35 via the bus 41.

The HDC 39 performs, for example, an error correcting code (ECC) process on the data signal in sector units having a predetermined number of bytes and sends the error corrected data to the interface circuit 40 via the bus 41. The interface circuit 40 converts the data from the HDC 39 to a predetermined communication mode and sends the converted data to the host computer 32.

Figure 3:
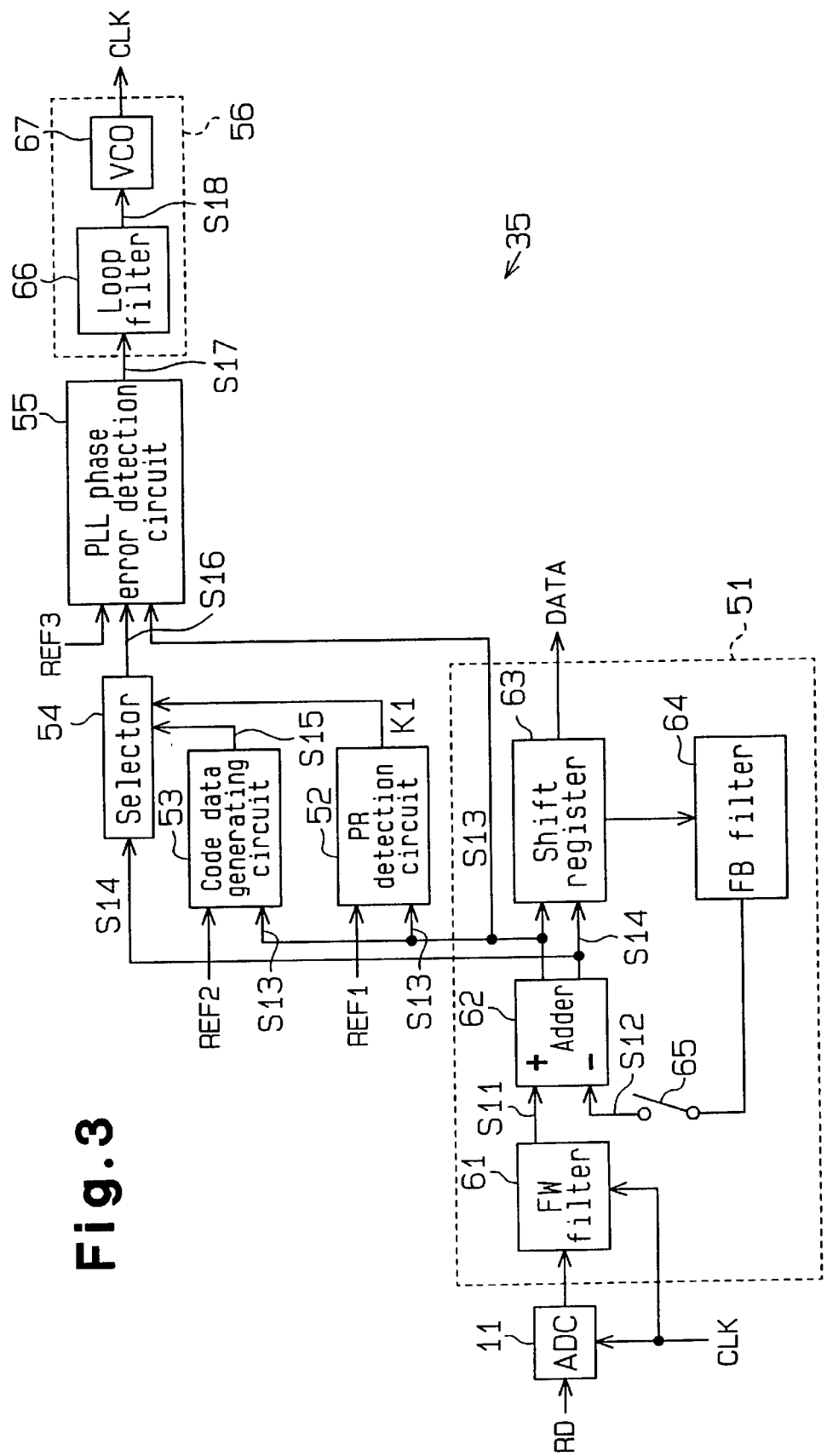
FIG. 3 is a schematic block diagram showing a signal processing circuit according to one embodiment of the present invention.

FIG. 3 is a schematic block diagram showing the signal processing circuit 35. The signal processing circuit 35 includes an analog-to-digital converter (ADC) 11, a decision feedback equalizer (DFE) 51, a preamble (PR) detection circuit 52, a code data generating circuit 53, a selector 54, a PLL phase error detection circuit 55, and a timing recovery PLL (TR-PLL) 56.

The ADC 11 samples the analog read signal RD read from the recording medium in accordance with the clock signal CLK output by the TR-PLL 56 and generates a digital data signal.

The DFE 51 includes a forward (FW) filter 61, an adder 62, a shift register 63, a feedback (FB) filter 64, and a switch 65.

The FW filter 61 is a digital filter having an arbitrary transmission characteristic and performs filtering using a filter coefficient set for the read data. The FW filter 61 receives the digital data signal from the ADC 11, filters the digital data signal from the ADC 11 using the filter coefficient in accordance with the clock signal CLK, and generates a digital data signal S11 having a maximum S/N ratio.

The adder 62 adds the filtered digital signal S11 from the FW filter 61 to an inverted signal of a feedback signal S12 from the FB filter 64, sends an added signal S13 to the PR detection circuit 52, the code data generating circuit 53, and the PLL phase error detection circuit 55. In other words, the adder 62 functions as a subtractor for subtracting the feedback signal S12 from the filtered digital data signal S11.

The adder 62 also compares the voltage of the added signal S13 with a reference voltage REF (not shown) and sends a first code signal S14 (i.e., one or zero), which indicates the comparison result, to the shift register 63, and the selector 54. The shift register 63 sequentially stores the first code signal S14 sent from the adder 62 in synchronism with the clock signal CLK. This stores the data, which comprises a plurality of bits, sampled in the past.

The data stored in the first bit of the shift register 63 (i.e., the first code signal S14) is output as a reproduction signal DATA. The reproduction signal DATA is the data stored in the recording medium. In this manner, the DFE 51 reproduces the code data recorded on the magnetic disc 33. The reproduction signal DATA undergoes a data decoding process. The decoded reproduction signal is sent to the host computer 32 via the HDC 39 and the interface circuit 40.

The FB filter 64 receives the sampling data from the shift register 63 and eliminates interference between codes that is included in the sampling data. The FB filter 64 generates the feedback signal S12 based on the sampling data stored in the shift register 63. The feedback signal S12 is sent to the adder 62 via the switch 65.

Figure 4:
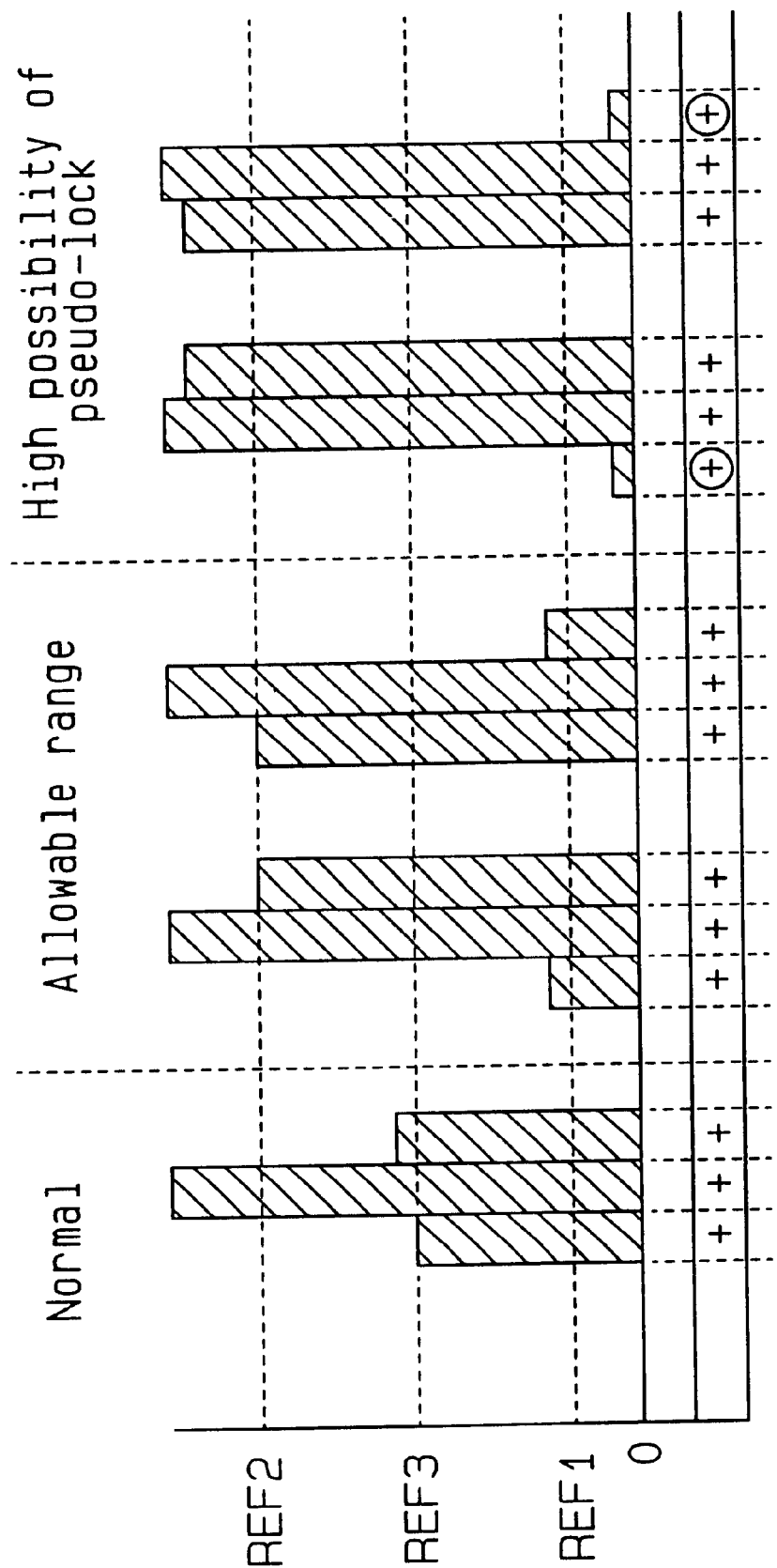
FIG. 4 is a chart showing the relationship between the added signal of an adder of the signal processing circuit of FIG. 3 and various reference signals.

The PR detection circuit 52 receives the added signal S13 from the adder 62 and a first reference signal REF1 and compares the added signal S13 with the first reference signal REF1 in order to determine whether the read signal RD is the read signal of the preamble data based on the comparison result. The first reference signal REF1 has a predetermined level that is sufficient for decreasing the error of the code determination based on the added signal S13. That is, the code determination may be erroneous due to noise when the code of the added signal S13 is determined by checking whether the added signal S13 is zero (0) or greater. Accordingly, erroneous code determination is prevented by setting the level of the first reference signal REF1 at a level that is not affected by noise. As shown in FIG. 4, in the preferred embodiment, the level of the first reference signal REF1 is set at a constant value that is higher than zero (0). However, the level of the first reference signal REF1 may be set at a value that is lower than zero.

FIG. 4 is a chart showing the positive waveforms of the added signal S13. A waveform taken when the sampling timing relative to the signal clock CLK is normal (when the sampling timing is substantially the same as the phase of the added signal S13) is shown at the left side of FIG. 4. Waveforms taken when the sampling timing is included in an allowable range is shown at the middle of FIG. 4. Waveforms taken when there is a high possibility of pseudo-lock is shown at the right side of FIG. 4.

When the PR detection circuit 52 confirms that the bit row showing the characteristics of the preamble data (in this case, "+++" or "---") that exceeds the first reference signal REF1 has been input a predetermined number of times (e.g., three times), the PR detection circuit 52 determines that the plurality of bit rows are the preamble data. Here, "+" indicates that the voltage of the sampled read signal RD is higher than the reference voltage REF, and "−" indicates that the voltage of the sampled read signal RD is lower than the reference voltage REF. The PR detection circuit 52 outputs a high detection signal K1 when detecting the preamble and a low detection signal K1 when not detecting the preamble. The level of the detection signal K1 can be changed as required.

The code data generating circuit 53 receives the added signal S13 from the adder 62 and a second reference signal REF2, compares the added signal S13 with the second reference signal REF2, and determines whether the added signal S13 is positive or negative. The level of the second reference signal REF2 is set at a level in the sampling point of the read signal RD where there is a high possibility of pseudo-lock in the TR-PLL 56.

In other words, in the normal waveform shown at the left side of FIG. 4 and the allowable waveforms shown at the middle of FIG. 4, the values of three consecutive added signals S13 are higher than the value of the first reference signal REF1 and the value of the second added signal S13 is higher than the values of the first and third added signals S13. If the phase is offset, the values of two consecutive added signals S13 are substantially the same as shown by the waveforms at the right side of FIG. 4. The level of the second reference signal REF2 is set such that two consecutive added signals S13 are detected. In the left and middle waveforms, among the three consecutive added signals S13, the levels of the middle (second) added signals S13 are higher than the second reference signal REF2.

When two added signals S13 having a level equal to or higher than the second reference signal REF2 continue, the code data generating circuit 53 generates code data corresponding to the preamble data based on the sampling point of the added signals S13 and sends the code data as a second code signal S15 to the selector 54. In other words, the input of the added signal S13 having a level equal to or higher than the second reference signal REF2 serve as a trigger and causes the code data generating circuit 53 to generate a second code signal S15 corresponding to the preamble data based on the two consecutive added signals, the levels of which are equal to or greater than the second reference signal REF2.

The selector 54 receives the first code signal S14, the second code signal S15, and the detection signal K1, selects either one of the code signals S14, S15 in response to the detection signal K1, and sends the selected signal as a selected code signal S16 to the error detection circuit 55. More particularly, the selector 54 selects the first code signal S14 in response to a high detection signal K1 and selects the second code signal S15 in response to a low detection signal K1. The code signal S14 is the code data of the adder 62 and the code signal S15 is the code data of the code data generating circuit 53. The selector 54 selects the code data of the adder 62 or the code data of the code data generating circuit 53 in response to the detection signal K1 and sends the selected code signal S16 to the error detection circuit 55.

The error detection circuit 55 receives the added signal S13 from the adder 62, the selected code signal S16 from the selector 54, and a third reference signal REF3 and detects the difference between the added signal S13 and the third reference signal REF3 as the phase error between the read signal RD and the clock signal CLK. The error detecting circuit 55 sends a pulse control signal S17, having a pulse width based on the phase error and the selected code signal S16, to the TR-PLL 56. The third reference signal REF3 has a value taken at a certain point of the digital data signal S11 output by the FW filter 61 in correspondence with an optimal preamble. The certain point is the point at which the read signal RD is sampled in accordance with the clock signal CLK when the phase of the read signal RD and the phase of the clock signal CLK substantially match and are thus in an optimal state. These point levels correspond to the preamble data. In other words, the third reference signal REF3 is set at a level corresponding to the preamble data. Accordingly, the difference between the third reference signal REF3 and the added signal S13 corresponds to the phase error between the read signal RD and the clock signal CLK.

The TR-PLL 56 matches the clock signal CLK, which is generated in accordance with the control signal S17 from the error detection circuit 55, with the phase of the read signal RD. More specifically, the TR-PLL 56 includes a loop filter 66 and a voltage control oscillator (VCO) 67. The loop filter 66 smooths the pulse control signal S17 and sends a DC voltage signal S18 to the VCO 67. The VCO 67 generates a clock signal CLK having a frequency corresponding to the voltage signal S18 from the loop filter 66. Accordingly, the voltage of the voltage signal S18 of the loop filter 44 rises and falls in accordance with the phase difference between the added signal S13 and the clock signal CLK that is detected by the error detection circuit 55. This causes the TR-PLL 56 to perform the matching operation so that the frequency of the clock signal CLK output by the VCO 67 matches the frequency of the preamble data of the read signal RD.

The shift register 63 samples the first code signal S14 output by the adder 62 in response to the edges of the clock signal CLK and stores the sampling data. That is, the shift register 63 performs sampling in accordance with the clock signal CLK at the bit transmission speed of the read signal RD. In this manner, the TR-PLL 56 performs phase matching of the clock signal CLK using the preamble data read signal. In the reproduction signal DATA generated by the DFE 51, interference between codes is eliminated from the read signal in accordance with the clock signal CLK.

Figure 5:
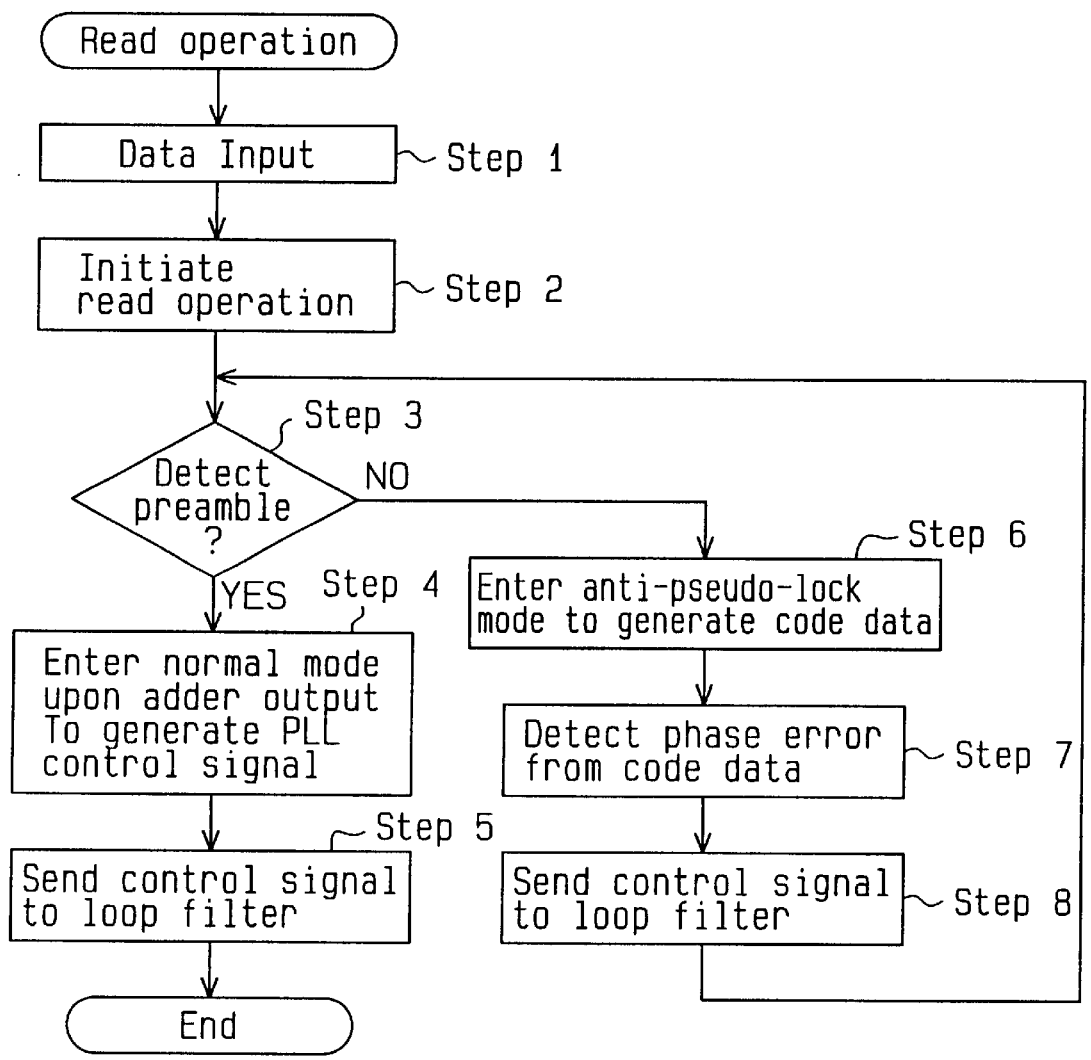
FIG. 5 is a flowchart showing the operation of the signal processing circuit of FIG. 3.

The operation of the signal processing circuit 35 will now be described with reference to the flowchart of FIG. 5.

Preamble data is first sent to the PR detection circuit 52 via the FW filter 61 and the adder 62 (step 1). The PR detection circuit 52 initiates the read operation and determines whether the received signal is the preamble data (step 2). If the PR detection circuit 52 detects the preamble data (step 3), the PR detection circuit 52 outputs a high detection signal K1. In accordance with the detection signal K1, the selector 54 sends the first code signal S14 output by the adder 62 as the selected code signal S16 to the error detection circuit 55. This causes the error detection circuit 55 to enter a normal mode in which the control signal of the TR-PLL 56 is generated in accordance with the first code signal S14 (step 4). In other words, the error detection circuit 55 detects the phase error from the added signal S13 and the code data (positive, negative) and sends the control signal S17 based on the detection result to the loop filter 66 of the TR-PLL 56 (step 5). The phase control of the TR-PLL 56 is performed in this manner.

If the preamble data is not detected in step 3, the code data generating circuit 53 determines whether the added signal S13 is equal to or greater than the second reference signal and enters an anti-pseudo-lock mode which generates phase error detection code data (positive/negative data) based on the determination result (step 6). The second code signal S15 based on the code information is sent to the error detection circuit 55 via the selector 54. The error detection circuit 55 detects the phase error based on the second code signal S15, the added signal S13, and the third reference signal REF3 (step 7) and sends the control signal S17 to the loop filter 66 of the TR-PLL 56 (step 8). The TR-PLL 56 performs phase matching of the clock signal CLK in accordance with the control signal S17. The sampling timing is corrected in this manner. If the preamble is detected by the PR detection circuit 52, the mode is shifted to the sampling mode and the error detection circuit 52 detects the phase error based on the first code signal S14 and the added signal S13.

As described above, the preamble detection circuit 52 compares the added signal from the adder 62 with the first reference signal REF1 and outputs the detection signal K1. The code data generating circuit 53 compares the added signal with the second reference signal REF2 and generates the second code signal S15 based on the comparison result. The phase error detection circuit 55 detects the phase error of the read signal RD based on the added signal S13 and the third reference signal REF 3, and generates the control signal S17 based on phase error and the first code signal S14 or the second code signal S15 selected by the selector 54. The timing discovery PLL 56 performs phase matching of the clock signal CLK in accordance with the control signal S17. Accordingly, the coefficient of the FW filter 61 need not be changed. This prevents pseudo-lock of the TR-PLL 56 and improves operation stability of the TR-PLL 56. Thus, the matching period is prevented from being prolonged and code reproduction is performed with high accuracy.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A method for controlling a timing recovery PLL that matches the phase of a clock signal with the phase of a preamble data signal, wherein the preamble data signal is part of a read signal corresponding to data read from a recording medium, the method comprising the steps of:
   generating a computation read signal by performing a predetermined computation on the read signal;
   generating a first code data using the computation read signal;
   comparing the computation read signal and a first reference signal;
   generating a second code data using the computation read signal;
   selecting one of the first code data and the second code data on the basis of the comparison result;
   detecting a phase error between the clock signal and the read signal by using the computation read signal and selected one of the first code data and the second code data; and
   matching the phase of the clock signal in accordance with the detected phase error.

2. The method according to claim 1, further comprising the steps of:
   detecting whether the computation read signal is the preamble data signal; and
   selecting the second code data when the computation read signal is not the preamble data signal.

3. The method according to claim 2, wherein the step of detecting whether the computation read signal is the preamble data signal includes comparing the computation read signal to a second reference signal.

4. The method according to claim 1, wherein the step of generating the second code data includes generating the second code data when two consecutive computation read signals are equal to or greater than the first reference signal.

5. The method according to claim 1, wherein the predetermined computation performed on the read signal includes selectively adding the read signal and a feedback signal.

6. A signal processing circuit comprising:
   a computation circuit for generating a computation read signal by performing a predetermined computation on a read signal which is read in accordance with a clock signal, wherein the read signal includes a preamble data signal, and wherein the computation circuit generates first code data by using the computation read signal;
   a code data generating circuit connected to the computation circuit to generate second code data based on the computation read signal;
   a phase error detection circuit for detecting the phase error between the clock signal and the read signal using one of the first code data and the second code data which is selected on the basis of a comparison result between the computation read signal and a first reference signal; and
   a PLL connected to the phase error detection circuit to match the phase of the clock signal in accordance with the detected phase error.

7. The signal processing circuit according to claim 6, wherein the comparing means is a preamble detection circuit which determines whether the computation read signal is the preamble data signal based on the comparison with the reference signal and generates the detection signal; and further includes a selector connected to the code data generating circuit, the preamble detection circuit, and the phase error detection circuit, wherein the selector selected one of the first code data and the second code data in accordance with the detection signal and sends the selected code data to the phase error detection circuit.

8. The signal processing circuit according to claim 7, wherein the code data generating circuit generates the second code data when two consecutive computation read signals are equal to or greater than the first reference signal.

9. The signal processing circuit according to claim 6, wherein the decision feedback equalizer includes an adder for selectively adding the read signal and a feedback signal to generate an added read signal.

10. A signal processing circuit comprising:
    a computation circuit for generating a computation read signal by performing a predetermined computation on a read signal which is read in accordance with a clock signal, wherein the read signal includes a preamble data signal;
    a first code data generation circuit for generating first code data using the computation read signal;
    a second code data generation circuit for generating second code data based on the computation read signal;
    a phase error detection circuit for detecting the phase error between the clock signal and the read signal using one of the first code data and the second code data which is selected on the basis of a comparison result between the computation read signal and a reference signal; and
    a PLL connected to the phase error detection circuit to match the phase of the clock signal in accordance with the detected phase error.

11. The signal processing circuit of claim 10, wherein the first code generation circuit is a comparator.

12. The signal processing circuit of claim 10, further comprising a selector for selecting one of the first code data and the second code data.

13. The signal processing circuit of claim 10, further comprising a decision feedback equalizer for reproducing the read data.

14. A signal processing circuit comprising:
a computation circuit for generating a computation read signal by performing a predetermined computation on a read signal which is read in accordance with a clock signal and for generating first code data by using the computation read signal, wherein the read signal includes a preamble data signal;
a code data generating circuit for generating second code data based on the computation read signal;
a phase error detection circuit for detecting the phase error between the clock signal and the read signal using one of the first code data and the second code data which is selected on the basis of a comparison result between the computation read signal and a reference signal; and
a PLL connected to the phase error detection circuit to match the phase of the clock signal in accordance with the detected phase error.

15. A signal processing circuit comprising:
a computation circuit for generating a computation read signal by performing a predetermined computation on a read signal which is read in accordance with a clock signal, wherein the read signal includes a preamble data signal;
a first code data generation circuit for generating first code data using the computation read signal;
a second code data generation circuit for generating second code data based on the computation read signal;
a phase error detection circuit for detecting the phase error between the clock signal and the read signal using one of the first code data and the second code data which is selected on the basis of a preamble detection signal; and
a PLL connected to the phase error detection circuit to match the phase of the clock signal in accordance with the detected phase error.

16. The signal processing circuit of claim 15, further comprising a preamble detection circuit for detecting the preamble data signal and generating the preamble detection signal.

17. A signal processing circuit comprising:
a computation circuit for generating a computation read signal by performing a predetermined computation on a read signal which is read in accordance with a clock signal and for generating first code data using the computation read signal, wherein the read signal includes a preamble data signal;
a code data generation circuit for generating second code data based on the computation read signal;
a phase error detection circuit for detecting the phase error between the clock signal and the read signal using one of the first code data and the second code data which is selected on the basis of a preamble detection signal; and
a PLL connected to the phase error detection circuit to match the phase of the clock signal in accordance with the detected phase error.

18. The signal processing circuit of claim 17, further comprising a preamble detection circuit for detecting the preamble data signal and generating the preamble detection signal.

19. A method for matching a phase of a clock signal with a phase of a preamble data signal, wherein the preamble data signal is part of a read signal, the method comprising the steps of:
generating a computation read signal by performing a predetermined computation on the read signal;
generating first code data using the computation read signal;
comparing the computation read signal and a reference signal;
generating second code data using the computation read signal;
selecting one of the first code data and the second code data on the basis of the comparison result;
detecting a phase error between the clock signal and the read signal by using the computation read signal and the selected code data; and
match the phase of the clock signal in accordance with the detected phase error.

20. A method for matching a phase of a clock signal with a the phase of a preamble data signal, wherein the preamble data signal is part of a read signal, the method comprising the steps of:
generating a computation read signal by performing a predetermined computation on the read signal;
generating first code data using the computation read signal;
detecting the preamble data signal to generate a preamble detection signal;
generating second code data using the computation read signal;
selecting one of the first code data and the second code data on the basis of the preamble detection signal;
detecting a phase error between the clock signal and the read signal by using the computation read signal and the selected code data; and
matching the phase of the clock signal in accordance with the detected phase error.

21. A signal processing circuit comprising:
a computation circuit for generating a computation read signal by performing a predetermined computation on a read signal which is read in accordance with a clock signal, wherein the read signal includes a preamble data signal; a first code data generation circuit for generating first code data using the computation read signal;
a second code data generation circuit for generating second code data based on the computation read signal;
a selector circuit for selecting one of the first code data and the second code data on the basis of a preamble detection signal, and outputting the selected one of the first code data and the second code data;
a phase error detection circuit for detecting the phase error between the clock signal and the read signal on the basis of the selected one of the first code data and the second code data; and
a PLL connected to the phase error detection circuit to match the phase of the clock signal in accordance with the detected phase error.

* * * * *

UNITED STATES PATENT AND TRADEMARK OFFICE
CERTIFICATE OF CORRECTION

PATENT NO. : 6,643,820 B2 Page 1 of 1
DATED : November 4, 2003
INVENTOR(S) : Tsuyoshi Omita It is certified that error appears in the above-identified patent and that said Letters Patent is hereby corrected as shown below:

<u>Column 10,</u>
Line 28, delete "selected" and insert -- selects -- therefor.

Signed and Sealed this

Twenty-ninth Day of June, 2004

JON W. DUDAS
*Acting Director of the United States Patent and Trademark Office*